United States Patent [19]
Ibrahim
[11] E
[45] Reissued
Patent Number: Re. 31,909
Date of Patent: Jun. 11, 1985

[54] REFRIGERATED DISPLAY CASE HAVING AMBIENT AIR DEFROST

[75] Inventor: Fayez F. Ibrahim, Niles, Mich.

[73] Assignee: Tyler Refrigeration Corporation, Niles, Mich.

[21] Appl. No.: 543,468

[22] Filed: Oct. 19, 1983

Related U.S. Patent Documents

Reissue of:
[64] Patent No.: 4,295,340
Issued: Oct. 20, 1981
Appl. No.: 60,459
Filed: Jul. 25, 1979

U.S. Applications:
[63] Continuation-in-part of Ser. No. 11,804, Feb. 14, 1979.

[51] Int. Cl.[3] ..... A47F 3/04; F25D 21/12
[52] U.S. Cl. ..... 62/82; 62/256; 62/277
[58] Field of Search ..... 62/80, 82, 255, 256, 62/277

[56] References Cited

U.S. PATENT DOCUMENTS

| | | | |
|---|---|---|---|
| 2,657,546 | 11/1953 | Smith | 62/277 X |
| 2,810,267 | 10/1957 | Reuter | 62/256 |
| 2,967,404 | 7/1961 | Detwiler | 62/256 |
| 2,984,085 | 5/1961 | Rainwater | 62/256 |
| 3,094,851 | 6/1963 | Beckwith | 62/256 |
| 3,122,892 | 3/1964 | Beckwith | 62/256 X |
| 3,371,503 | 3/1968 | Perez | 62/277 X |
| 3,898,864 | 8/1975 | Steelman | 62/256 X |
| 4,026,121 | 5/1977 | Aokage et al. | 62/256 X |
| 4,182,130 | 1/1980 | Loung | 62/256 X |
| 4,329,852 | 5/1982 | Ibrahim et al. | 62/256 |

FOREIGN PATENT DOCUMENTS

| | | | |
|---|---|---|---|
| 2804008 | 8/1978 | Fed. Rep. of Germany | 62/256 |

*Primary Examiner*—William E. Tapolcai

[57] ABSTRACT

An open top refrigerated display case having an ambient air automatic defrost system and a method of operating such a case. A single air conduit extends in a U-shaped formation along opposing side walls and the bottom wall of the display case. The air conduit has openings at both ends in the location of the upper portions of the side walls. Arranged within the air conduit is at least one reversible fan and a set of refrigeration coils. During a refrigeration cycle the fan circulates air through the air conduit in a first direction towards the refrigeration coils. When frost buildup within the display case has reached a certain level, the system is switched to a defrost cycle. During the defrost cycle, the fan circulates the air in the opposite direction through the air conduit and draws in ambient air from outside of the display case. Since such ambient air is of a higher temperature than the normally refrigerated air, it serves to defrost the system. The ambient air, after passing over the evaporator coils and through the air conduit, is expelled from the air conduit in a direction towards the outer side of the refrigerated case and away from the interior of the case.

32 Claims, 3 Drawing Figures

REFRIGERATED DISPLAY CASE HAVING AMBIENT AIR DEFROST

Matter enclosed in heavy brackets [ ] appears in the original patent but forms no part of this reissue specification; matter printed in italics indicates the additions made by reissue.

RELATED APPLICATIONS

The present application is a continuation-in-part of my copending patent applications Ser. No. 11,804, filed Feb. 14, 1979. All of these prior applications are hereby incorporated by reference.

BACKGROUND OF THE INVENTION

The present invention relates to open top refrigerated display cases having an ambient air defrost system. Both within the specification and the claims of the present application, all references to refrigeration apparatus or refrigeration operations are intended to include cooling both at a temperature below 32° F., such as associated with frozen food display cases, and in excess of 32° F., such as typically associated with dairy food and fresh meat display cases.

In the operation of all types of refrigerated display cases, it is desirable to include a system capable of automatically defrosting the display case. The defrost cycle can be actuated either at set periodic times or when the frost buildup within the system has reached a certain predetermined level. Such systems are typically thermostatically controlled so as to switch from a refrigeration cycle to a defrost cycle of operation. By this manner of operation, it is possible to avoid any significant frost buildup within the display case.

Typically within the prior art, there have been three different approaches employed for defrosting refrigerated display cases. The first approach involves the use of electric resistance heaters that are arranged adjacent to the refrigeration coils of the refrigeration mechanism. During a defrost cycle, these heaters supply heat in an effort to melt the frost buildup on the coils but also adds warmer air to the air conduit for circulation within the case. The particular technique is relatively simple both in its construction and operation. However, since the electrical heaters are high voltage heaters that utilize significant electricity during operation, with the rapidly increasing cost of electricity it has become extremely uneconomical to employ such systems. Furthermore, the warm air circulated in the case can raise the temperature of the case too high. Thus, attempts have been made to find other alternatives to such a system.

A second type of system circulates hot compressed gaseous refrigerant through the refrigeration coils during the defrost cycle. During the defrost cycle, a valve control mechanism shuts off the supply of refrigerant to the refrigeration coils and alternatively feeds superheated compressed gaseous refrigerant through the coils. This hot gas serves to melt any frost buildup that has occurred on the refrigeration coils but simultaneously provides heat within the air conduit which can be circulated through the display case, which again is disadvantageous. While this type of system does not suffer from the high cost of operation of the electrical heater defrost system, the heated gas system involves a relatively high construction cost. Due to the requirement that the system be able to selectively switch between the supply of heated gas and refrigerant to the refrigeration coils, a complicated valving structure must be provided. Such a mechanism significantly increases the cost of construction of the display case. In addition, the provision of such a complicated system only increases the number of complex parts capable of breaking down and necessitating costly repairs.

The third type of system employed for defrosting display cases relies upon ambient air. It is this general category with which the invention of the present application is concerned. One type of system that employs ambient air during the defrost cycle is exemplified by those embodiments illustrated in U.S. Pat. Nos. 3,403,525, 3,850,003 and 3,937,033, all to Beckwith et al. Each of these systems uses fans separate from the main air circulating fans. These extra fans are turned on during the defrost cycle for pulling ambient air from outside of the display case into the air conduits. A second type of system is illustrated in U.S. Pat. No. 3,082,612 to Beckwith, which system draws ambient air into the main circulation path through ports located in the lower front panel of the refrigerated display case. Such ports are normally closed during the refrigeration cycle and are opened during the defrosting cycle. The Beckwith et al. '003 patent indicates that the concepts described in U.S. Pat. Nos. 3,082,612 and 3,403,525 did not prove to be practical and hence were not commercially feasible.

Finally, a third type of ambient air defrosting system is shown in U.S. Pat. No. 4,144,720 to Subera et al., which is assigned to the same assignee as the present application. In the foregoing patent application, an open front refrigerated display case having primary and secondary air conduits is disclosed. In this system, reversible fans are employed for reversing the direction of flow of air within the conduits and simultaneously drawing in air from outside of the display case.

Another system employing reversible fans for ambient air defrost is shown in U.S. Pat. No. 4,026,121. This patent, however, refers to short-circuiting the air flow between the primary and secondary air bands for the purpose of supplying warmer air to the primary band.

Several exemplary embodiments of open top refrigerated display cases are shown in the following U.S. Pat.: No. 3,324,783 to Hickox; No. 3,371,503 to Perez; and No. 3,543,532 to Gatton et al. The patent to Perez also illustrates the provision of conduits containing liquid refrigerant in the upper portions of the openings in the air conduit for helping to eliminate frost deposits on the grid structures arranged in such openings.

It has been recognized that an ambient air defrost operation can be incorporated into an open top refrigerated display case as disclosed in U.S. Pat. No. 4,120,174 to Johnston. The Johnston patent illustrates an open top case having a single air conduit extending around the case. During the refrigeration cycle, the air flows in a first direction and during the defrost cycle the direction of the air flow is reverse with ambient air being drawn into the conduit. The quantity of air flow during the defrost cycle is greater than during refrigeration. The defrost air, after passing through the conduit, is expelled in a direction up and over the refrigerated case. It has been found during the development of the present invention, that with a defrost air flow pattern such as disclosed in the Johnston patent a significant portion of the expelled air will fall back towards the access opening in the refrigerated case and reenter the air conduit at the other side of the access opening.

SUMMARY OF THE INVENTION

An object of the present invention is to provide an ambient air defrost system within an improved open top refrigerated display case.

Another object of the present invention is to provide an energy efficient open top refrigerated display case employing an ambient air defrost system in which the ambient air is drawn into the air conduit by reversing the direction of flow of air through the conduit.

A further object of the present invention is to provide an open top refrigerated display case having a single air conduit and a reversible fan arranged within the conduit for propelling air in a forward direction through the refrigeration coils during a refrigeration cycle and circulating air in a reverse direction so as to draw in ambient air from outside of the case during a defrost cycle and to prevent the defrost air when expelled from the conduit from being drawn back into the refrigerated case.

Still another object of the present invention is to provide an open top refrigerated display case having an ambient air defrosting system and a mechanism for avoiding the buildup of frost on the grill structures arranged at the open ends of the air conduit within the display case.

A still further object of the present invention is to provide an improved procedure for defrosting an open top refrigerated display case by the use of ambient air.

These objectives are achieved by the construction of an open top refrigerated display case in accordance with the present invention. The display case is provided with a U-shaped air conduit that extends along one of the side walls of the case, the bottom wall of the case and an opposing side wall of the case. The air conduit has openings at its opposite ends near the top of the side walls of the display case. Arranged within the air conduit are the refrigeration coils and at least one reversible fan. In larger display cases, it is often necessary to use either two or three fans spaced along the longitudinal axis of the case in order to generate a sufficient force for circulating the air; in such a system, however, each fan preferably would be a reversible fan and operate in the same manner as disclosed herein in accordance with the present invention.

The reversible fan arranged within the U-shaped air conduit is capable of either circulating in a first direction towards the refrigeration coils during a refrigeration cycle or when the case is switched into a defrost cycle circulating the air in a second, opposite, direction. For the sake of convenience herein, the first direction shall be referred to as the forward direction and the second, opposite, direction as the reverse direction. The openings in the ends of the air conduit are aligned so that during the refrigeration cycle, refrigerated air leaves a first of the openings in a path towards the second opening so as to form an air curtain across the top of the display case. This air travelling across the top of the display enters the second opening in the air conduit and is drawn along the conduit back towards the fan thereby establishing a continuous refrigerated air band. When the display case is switched into a defrost cycle, the refrigeration coils are deactivated and the direction of air flow is reversed. During such reverse air flow, the air leaves the air conduit through the second opening and is directed up and away from the display case; i.e., towards the outside of the display case, thereby preventing portions of the defrost air from falling back towards the access opening in the case and being drawn into the air conduit. Consequently, during the reverse flow of air no air curtain is established and hence ambient air from outside of the case is drawn in through the first opening in the air conduit. Such ambient air being warmer than the refrigerated air serves to defrost the refrigeration coils.

It has been found to be highly advantageous to avoid having the defrost air flow reentering the conduit. The ambient air as it passes over the evaporator coils expels heat to the coils and the air drops in temperature. If the cooled defrost air reenters the conduit then this will significantly slow down the defrost operation. By directing the defrost air away from the refrigerated case, the defrost time period can be substantially shortened, e.g., on the order of 20% or more. This decrease in defrost time provides a corresponding improvement in the energy efficiency of the refrigerated case.

As frost accumulates on the evaporator coils during the refrigeration cycle, the conduit becomes blocked. Hence when the defrost cycle is initiated the quantity of air flow will be substantially less than the air flow during the refrigeration cycle. As the defrost cycle continues and the frost is eliminated, the defrost air flow will rise back toward the level of the refrigeration air flow, although not surpassing it.

By constructing an open top refrigerated display case in accordance with the present invention as described and claimed herein, the cost of manufacturing, maintaining and operating the display case can be minimized significantly. The display case according to the present invention has less parts than many of the other prior art systems, such as those shown by the patents to Beckwith et al., listed above, which require the use of additional fans and/or additional moving parts.

The display case is also significantly less complex than the gas defrost systems and hence far less expensive to construct. The display case also avoids the huge operating costs incurred in employing the systems with electric heating defrost. Furthermore, the display case of the present invention is much more energy efficient than the case disclosed in the above-noted patent to Johnston.

In order to eliminate the buildup of condensation and frost on the grill structures mounted at the openings at the ends of the air conduit, it may be desirable to provide some type of mechanism for generating heat in these areas. For this purpose, within each of the areas, tubes containing the liquid refrigerant used in the system can be provided. These tubes are connected to the line that carries the liquid refrigerant for the refrigeration coils. Since the liquid refrigerant is warmer than the refrigerated air, the tubes provide a limited quantity of heat within each of the openings. The quantity of heat, however, is sufficient to help eliminate the condensation and the resulting buildup of frost.

DESCRIPTION OF THE PREFERRED EMBODIMENTS

Figure 1:
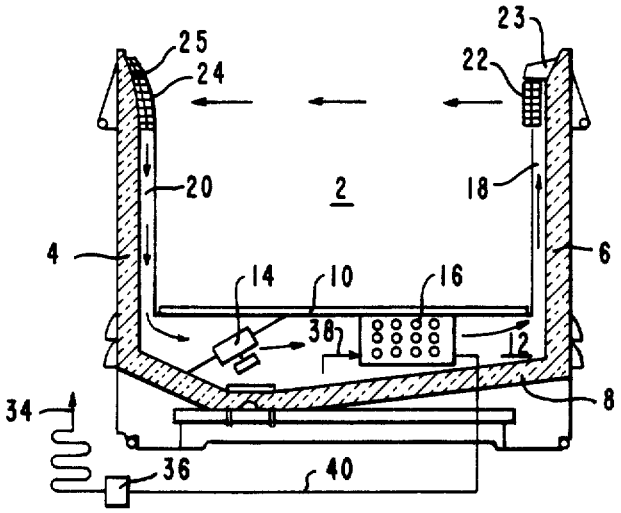
FIG. 1 is a sectional side elevational view of an open top refrigerated display case in accordance with the present invention, when the display case is operated during a refrigeration cycle.

An open top refrigerated display case 2 constructed in accordance with the present invention is illustrated in FIG. 1. The display case would normally have four side walls along with an appropriate bottom wall, with the top portion of the case remaining open. It is possible, however, for a portion of the top opening to be closed. One such possibility could arise where the refrigerated case is to be placed against a wall or some other upright member. In that situation, the rear wall of the refrigerated case might extend slightly forward over a portion of the top of case. Such a modification, however, would have no bearing upon the present invention nor the operation thereof.

In FIG. 1, there is illustrated two side walls 4 and 6 of case 2 along with bottom wall 8. All of these walls along with the other two side walls that are not illustrated would be appropriately insulated Positioned above bottom wall 8 is a bottom shelf 10. The spacing between shelf 10 and bottom wall 8 is large enough to enable the fans and refrigeration coils, which are described later herein, to be arranged within that location.

Extending along side wall 4, bottom wall 8 and side wall 6 is an air conduit 12. Arranged within air conduit 12 is at least one fan 14. While only one fan is illustrated, typically for refrigerated cases that are eight feet long, two fans are employed and for cases twelve feet long there are three fans. The number of fans merely depends on the length of the case and the size of the fans but have no bearing upon the scope of the present invention. All the fans arranged within air conduit 12 are reversible fans capable of being driven for propelling air in either direction.

Air conduit 12 has openings 18 and 20 at both of its ends at the top of the refrigerated display case. A directional control grill 22 is mounted on top of opening 18. Grill 22 is preferably constructed so as to assist in directing air leaving air conduit 12 through opening 18 towards the opposite side of the display case. At the opposite side of the display case above opening 20 there is positioned another grill structure 24. Grill 24 also can be constructed to help control the direction of the air flow through opening 20. Such air directing grill structures are generally known in the prior art, such as the patent to Hickox mentioned above. In addition to helping in controlling the direction of flow of the air entering and leaving openings 18 and 20, grills 22 and 24 also protect the openings from various debris, such as trash, keys and coins.

Refrigeration coils 16 are positioned within air conduit 12 at a location adjacent to fan 14. In a conventional manner, when the display case is operated in a refrigeration cycle, the air passing through refrigeration coil 16 is cooled, or refrigerated. The extent to which air is cooled depends on the use to which the display case is to be put. If the display case is to serve for holding frozen food, then the air must be sufficiently cooled so as to maintain the interior of the case below 32° F., If, however, the display case is used for storage of non-frozen products, such as dairy products, then a temperature slightly in excess of 32° F. can be maintained. The term refrigeration, however, as used herein is intended to cover both types of system.

Mounted above opening 18 and grill 22 is a hood-like structure 23. Hood 23 closes off the top of opening 18 thereby preventing air leaving conduit 12 through the opening to travel upwardly. This helps to further control the direction of the flow of air out through grill 22 towards the opening 20. In contrast, no such hood-type structure is mounted over opening 20 and grill 24.

Figure 3:
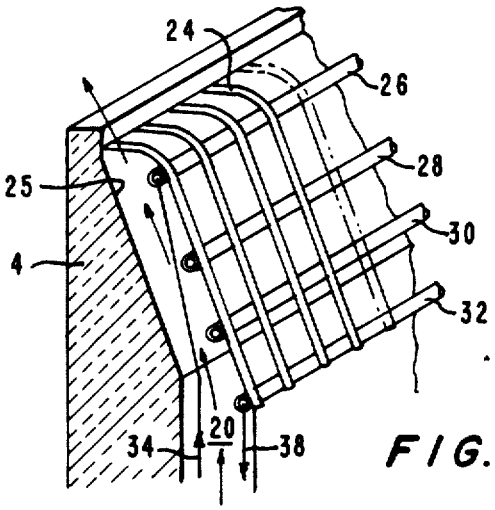
FIG. 3 is a perspective sectional view of a portion of the display case in the area of the opening at one of the ends of the air conduit.

Turning now to the structural arrangement in the area of opening 20, as shown in FIG. 3, the inner surface 25 of the top part of side wall 4 is sloped in a direction towards the outside of display case 2. This sloped construction of surface 25 helps to direct air leaving conduit 12 through opening 20 in an upwardly direction and away from the display case as shown by the arrows in FIG. 3.

During the refrigeration cycle of operation of the display case, air is circulated through air conduit 12 by fan 14 in a forward direction towards and through refrigeration coils 16, which are activated for cooling. The air is cooled when passing through refrigeration coils 16. The cooled air then travels through that portion of conduit 12 along side wall 6. As the air reaches opening 18 in conduit 12, it is prevented from travelling in a straight upward direction by hood 23 and instead is forced out through grill 22 in a direction toward grill 24 and opening 20 in the top end of opposing side wall of the display case. In this manner, a curtain of cooled air is established across the top of the display case. Since cool air naturally falls, some of the refrigerated air from the air curtain will settle into the display case, thereby providing for further cooling. This air curtain also separates the warmer ambient air outside of the display case from the cooler air inside of the display case thereby helping to maintain the refrigerated temperature within the case.

The air emitted through grill structure 22 and travelling across the air curtain is received into opening 20 in the air conduit through grill structure 24. This air is then drawn back into air conduit 12 by a suction force established by fan 14. Thus, during the refrigeration cycle a continuous band of cooled air is circulated by fan 14 through the display case. The direction of travel of such air along the air band is illustrated in FIG. 1.

Figure 2:
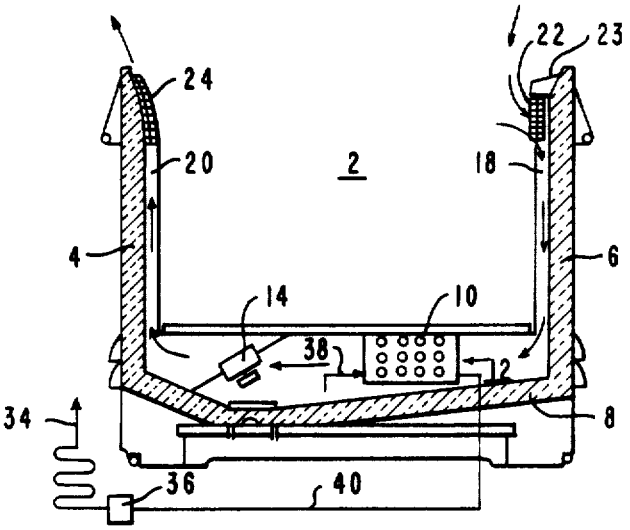
FIG. 2 is a view similar to that of FIG. 1 of the refrigerated display case except that the display case is being operated in a defrost cycle.

Turning now to the defrost cycle, the air flow during this cycle of operation is illustrated in FIG. 2. In any one of different conventional manners, the display case can be theromstatically or otherwise controlled so as to switch between the refrigeration cycle and the defrost cycle. By one such technique, the switching can occur when a certain degree of frost buildup is detected on the refrigeration coils. Another possible alternative is at set time intervals to switch the operation of the display case from a refrigeration cycle to a defrost cycle.

During the defrost cycle, the operation of fan 14 is reversed so as to propel air in a reverse direction away from refrigeration coils 16. When the fan is operated in this mode, air passes along conduit 12 out through opening 20. Unlike the structural arrangement of grill 22 and hood 23 on top of opening 18, there is no hood on top of grill 24. Thus, the air upon exiting from opening 20 passes directly upwardly. In addition, side wall 4 at its upper end has sloped inner surface 25 located above opening 20 in the area of grill structure 24. As the air leaving conduit 12 during the defrost cycle passes along sloped wall 25, the path of air curves into an arc directed up and away from display case 2. Thus, in this mode of operation, there is no air curtain established across the top of display case 2 and also no continuous air band established through the display case.

As air is propelled out of conduit 12 through opening 20, a partial vacuum is established within the air conduit so as to cause air to be sucked into the conduit through opening 18. Since there is no air curtain in existence across the top of the display case during the defrost cycle, the air sucked into the conduit through opening 18 is drawn from the ambient air surrounding the display case. Since such ambient air is of a higher temperature than the refrigerated air during the refrigeration cycle, such ambient air serves to defrost any frost buildup within the system, including, in particular, on the refrigeration coils. The direction of air flow during the defrost cycle is shown by the arrows in FIG. 2.

During operation of the refrigerated display case, it is typical for condensation to collect in the area of openings 18 and 20 on grills 22 and 24. As the refrigerated air is circulated through the display case during the refrigeration operation, such condensation turns into frost. A buildup of such frost eventually can clog the openings in grills 22 and 24.

In order to eliminate the condensation-frost buildup problem on grills 22 and 24, it is possible to provide a small quantity of heat in each of these locations. The generation of such heat while sufficiently small so as not to affect the refrigeration operation within the display case, is still sufficient so as to eliminate the buildup of frost on the grills.

As previously mentioned, due to the high cost of electricity, it is undesirable to provide any type of heat by electrical heaters. An efficient and extremely economical system for supplying the small quantity of heat needed in the areas of grills 22 and 24 can be constructed utilizing tubes carrying the liquid refrigerant used within the system and arranging such tubes in the area of each of the grill structures. Thus, as shown in FIG. 3, a plurality of tubes 26, 28, 30 and 32 are arranged behind grill 24. Similar tubes can also be mounted behind grill 22. Tubes 26–32 are supplied with liquid refrigerant through line 34; the refrigerant is pumped through the system by a pump 36. The liquid refrigerant leaving tubes 26–32 passes through line 38 to the refrigeration coils. A return line 40 interconnects refrigeration coils 16 with pump 36. If similar liquid carrying tubes are to be employed behind grill structure 22, then the liquid could be carried from tubes 26–32 to the tubes located behind grill 22 and then onto the refrigeration coils.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. An open top refrigerated display case being selectively operative in a refrigeration cycle and a defrost cycle, said case comprising: a bottom wall and four side walls; a single air conduit extending along a first of said side walls, along said bottom wall and a second of said side walls, said first and second side walls being opposing side walls, said air conduit having first and second openings at its opposite ends and each of said openings being located near the top portion of the respective said side wall; means for refrigerating air moving through said conduit during a refrigeration cycle, said means for refrigerating being arranged within said air conduit, air circulating means arranged within said air conduit, said air circulating means circulating within said air conduit in a forward direction during a refrigeration cycle and circulating air in a reverse direction during a defrost cycle, and said air circulating means drawing in ambient air from outside of said display case through said first opening when said air circulating means circulates air within said air conduit in the reverse direction; means for switching operation of said display case between a refrigeration cycle and a defrost cycle and correspondingly causing said air circulating means to change the direction of circulation of air within said air conduit; and means for directing air leaving said air conduit upwardly and over the outside of the adjacent said side wall so as to flow away from said case when such air is flowing in said reverse direction so that such air is prevented from reentering said air conduit.

2. A display case according to claim 1 wherein said first opening within said air conduit serves as an air outlet during a refrigeration cycle and said second opening serves as a return air inlet during a refrigeration cycle, said first and second openings are aligned so that at least a substantial portion of air leaving said first opening during a refrigeration cycle is received within said second opening thereby enabling a continuous refrigerated air band to be established within said case during a refrigeration cycle.

3. A display case according to claim 2 wherein: during a defrost cycle, said air circulating means serves to draw in ambient air surrounding said case into said air conduit through said first opening; and said second opening and the portion of said air conduit adjacent to said second opening are constructed such that air leaving said second opening during a defrost cycle is directed upwardly and away from said case.

4. A display case according to claim 1 or 3 further comprising means for providing heat within said air conduit in the area of said second opening during a refrigeration cycle so as to limit the amount of condensation and frost buildup within the area of said second opening during such refrigeration cycle.

5. A display case according to claim 4 wherein said means for providing heat includes a plurality of tubes containing a liquid having a higher temperature than the air entering said second opening during a refrigeration cycle.

6. A display case according to claim 5 further comprising further heating means for providing heat within said air conduit in the area of said first opening during a refrigeration cycle so as to limit the amount of condensation and frost buildup within the area of said first opening during such refrigeration cycle.

7. A display case according to claim 6 wherein said further heating means includes a plurality of further tubes containing a liquid having a higher temperature than the air leaving said first opening during a refrigeration cycle.

8. A display case according to claim 7 wherein said liquid in all of said liquid containing tubes is liquid refrigerant that is also circulated through said refrigerating means.

9. An open top refrigerated display case being selectively operative in a refrigeration cycle and a defrost cycle, said case comprising: a bottom wall and side walls; an air conduit extending along a first of said side walls, along said bottom wall and a second of said side walls, said air conduit having first and second openings at its opposite ends and each of said openings being located near the top portion of the respective said side wall; means for refrigerating air moving through said conduit during a refrigeration cycle, said means for refrigerating being arranged within said air conduit; air circulating means arranged within said air conduit, said air circulating means circulating air within said air conduit in a forward direction during a refrigeration cycle and circulating air in a reverse direction during a defrost cycle, said air circulating means drawing in ambient air from outside of said display case through said first opening when said air circulating means circulates air within said air conduit in the reverse direction; means for switching operation of said display case between a refrigeration cycle and a defrost cycle; and means for directing air leaving said air conduit upwardly and over the outside of the adjacent said side wall so as to flow away from said case when such air is flowing in said reverse direction so that such air is prevented from reentering said air conduit.

10. A display case according to claim 9 wherein said first opening within said air conduit serves as an air outlet during a refrigeration cycle and said second opening serves as a return air inlet during the refrigeration cycle, said first and second openings are aligned so that at least a substantial portion of air leaving said first opening during a refrigeration cycle is received within said second opening thereby enabling a continuous refrigerated air band to be established within said case during a refrigeration cycle.

11. A display case according to claim 10 wherein: during a defrost cycle operation, said air circulating means draws in ambient air surrounding said case into said air conduit through said first opening; and said second opening and the portion of said air conduit adjacent to said second opening are constructed such that air leaving said second opening during a defrost cycle is directed upwardly and away from said case.

12. A method for selectively operating an open top refrigerated display case in a refrigeration cycle and a defrost cycle, where the case includes a bottom wall and four side walls, a single air conduit extending along a first of the side walls, along the bottom wall and a second of the side walls, the first and second side walls being opposing side walls, the air conduit having first and second openings at its opposite ends and each of the openings being located near the top portion of the respective side wall; the method comprising the steps of: refrigerating air moving through the air conduit during a refrigeration cycle; circulating air within the air conduit in a forward direction during a refrigeration cycle; circulating air in a reverse direction during a defrost cycle; drawing in ambient air from outside of said display case through the first opening when air is circulated within the air conduit in the reverse direction; switching the operation of the display case between the refrigeration cycle and the defrost cycle and corespondingly causing the direction of circulation of air within the air conduit to be changed; and directing the air leaving the air conduit upwardly and over the outside of the adjacent side wall so as to flow away from the case when such air is flowing in the reverse direction.

13. A method according to claim 12 further comprising the step of drawing in ambient air surrounding the display case into the air conduit through the first opening during a defrost cycle.

14. A method for selectively operating an open top refrigerated display case in a refrigeration cycle and a defrost cycle, where the case includes: a bottom wall and side walls, an air conduit extending along a first of the side walls, along the bottom wall and a second of the side walls, the air conduit having first and second openings at its opposite ends and each of the openings being located near the top portion of the respective side wall; the method comprising the steps of: refrigerated air moving through the air conduit during a refrigeration cycle; circulating air within the air conduit in a forward direction during a refrigeration cycle; circulating air in a reverse direction during a defrost cycle; drawing in ambient air from outside of said display case through the first opening when air is circulated within the air conduit in the reverse direction; switching the operation of the display case between a refrigeration cycle and a defrost cycle; and directing air leaving the air conduit upwardly and over the outside of the adjacent side wall so as to flow away from the case when such air is flowing in the reverse direction.

15. A display case for the storage of refrigerated products therein and having an access opening in its top for enabling the refrigerated products to be removed, said display case being selectively operative in a refrigeration cycle and a defrost cycle, said case comprising: a single air conduit extending along said display case, said air conduit being approximately U-shaped and extending along bottom and side walls of said display case, and said air conduit having first and second openings at its opposite ends and each of said openings being located at one side of said access opening; means for refrigerating air moving through said conduit during a refrigeration cycle, said means for refrigerating being arranged with said air conduit; air circulating means arranged within said air conduit, said air circulating means circulating air within said air conduit in a forward direction during a refrigeration cycle and circulating air in a reverse direction during a defrost cycle, and said air circulating means drawing in ambient air from outside said display case through said first opening when said air circulating means circulates air within said air conduit in the reverse direction; means for switching the operation of said display case between a refrigeration cycle and a defrost cycle and correspondingly causing said air circulating means to change the direction of circulation of air within said air conduit; and means for causing air leaving said conduit to flow upwardly and over the outside of the adjacent said side wall so as to flow away from said case when such air is flowing in said reverse direction so that such air is prevented from reentering said air conduit.

16. A display case according to claim 15 wherein said first opening within said air conduit serves as an air outlet during a refrigeration cycle and said second opening serves as a return air inlet during a refrigeration cycle, said first and second openings are aligned so that at least a substantial portion of air leaving said first opening during a refrigeration cycle is received within said second opening thereby enabling a continuous refrigerated air band to be established within said case during a refrigeration cycle.

17. A display case according to claim 16 wherein: during a defrost cycle, said air circulating means serves to draw in ambient air surrounding said case into said air conduit through said first opening; and said second opening and the portion of said air conduit adjacent to said second opening are constructed such that air leaving said second opening during a defrost cycle is directed away from said case.

18. A display case according to claim 15 or 17 further comprising means for providing heat within said air conduit in the area of said second opening during a refrigeration cycle so as to limit the amount of condensation and frost buildup within the area of said second opening during such refrigration cycle.

19. A display case according to claim 18 wherein said means for providing heat includes a plurality of tubes containing a liquid having a higher temperature than the air entering said second opening during a refrigeration cycle.

20. A display case according to claim 19 further comprising further heating means for providing heat within said air conduit in the area of said first opening during a refrigeration cycle so as to limit the amount of condensation and frost buildup within the area of said first opening during such refrigeration cycle.

21. A display case according to claim 20 wherein said further heating means includes a plurality of further tubes containing a liquid having a higher temperature than the air leaving said first opening during a refrigeration cycle.

22. A display case according to claim 21 wherein said liquid in all of said liquid containing tubes is liquid refrigerant that is also circulated through said refrigerating means.

*23. A display case for the storage of a refrigerated products therein and having an access opening into a storage space for enabling the refrigerated products to be removed, said display case being selectively operative in a refrigeration cycle and a defrost cycle, said case comprising: a single air conduit extending along bottom and side walls of said display case, and said air conduit having first and second openings at its opposite ends and each of said openings being located adjacent said access opening; means for refrigerating air moving through said conduit during a refrigeration cycle, said means for refrigerating being arranged within said air conduit; air circulating means arranged within said air conduit in a forward direction during a refrigeration cycle and circulating air in a reverse direction during a defrost cycle, and said air circulating means drawing in ambient air from outside of said display case through said first opening when said air circulating means circulates air within said air conduit in the reverse direction; means for switching the operation of said display case between a refrigeration cycle and a defrost cycle and correspondingly causing said air circulating means to change the direction of circulation of air within said air conduit; and structural means for causing air leaving said conduit to flow upwardly and over the outside of the adjacent said side wall so as to flow away from said case when such air is flowing in said reverse direction so that such air is prevented from reentering said air conduit.*

*24. A display case according to claim 23, wherein said first opening of said air conduit serves as an air outlet during a refrigeration cycle and said second opening serves as a return air inlet during a refrigeration cycle, said first and second openings are aligned so that at least a substantial portion of air leaving said first opening during a refrigeration cycle is received within said second opening thereby enabling a continuous refrigerated air band to be established across said access opening said case during a refrigeration cycle.*

*25. A display case according to claim 24, wherein during a defrost cycle, said air circulating means serves to draw in ambient air surrounding said case into said air conduit through said first opening; and said second opening and the portion of said air conduit adjacent to said second opening are constructed such that air leaving said second opening during a defrost cycle is directed away from said case.*

*26. A display case according to claim 23, further comprising means for providing heat within said air conduit in the area of said second opening during a refrigeration cycle so as to limit the amount of condensation and frost buildup within the area of said second opening during such refrigeration cycle.*

*27. A display case according to claim 26, wherein said means for providing heat includes a plurality of tubes containing a liquid having a higher temperature than the air entering said second opening during a refrigeration cycle.*

*28. A display case according to claim 27, further comprising further heating means for providing heat within said air conduit in the area of said first opening during a refrigeration cycle so as to limit the amount of condensation and frost buildup within the area of said first opening during such refrigeration cycle.*

*29. A display case according to claim 28, wherein said further heating means includes a plurality of further tubes containing a liquid having a higher temperature than the air leaving said first opening during a refrigeration cycle.*

*30. A display case according to claim 29, wherein said liquid in all of said liquid containing tubes is liquid refrigerant that is also circulated through said refrigerated means.*

*31. A method for selectively operating a refrigerated display case in a refrigeration cycle and a defrost cycle, where the case includes an access opening, a bottom wall and side walls, a single air conduit extending along bottom and side walls, said air conduit having first and second openings at its opposite ends and each of the openings being located adjacent said access opening; the method comprising the steps of: refrigerating air moving through the air conduit during a refrigeration cycle and circulating air within the air conduit in a forward direction during a refrigeration cycle; circulating air in a reverse direction during a defrost cycle and drawing in ambient air from outside of said display case through the first opening when air is circulated within the air conduit in the reverse direction; switching the operation of the display case between the refrigeration cycle and the defrost cycle and correspondingly causing the direction of circulation of air within the air conduit to be changed; and directing the air leaving the air conduit upwardly and over the outside of the adjacent side wall by contact with structural means so as to flow away from the case when such air is flowing in the reverse direction.*

*32. A method according to claim 31, further comprising the step of drawing in ambient air surrounding the display case into the air conduit through the first opening during a defrost cycle.*

* * * * *